(12) United States Patent
Juvinall et al.

(10) Patent No.: US 7,387,039 B1
(45) Date of Patent: Jun. 17, 2008

(54) CONTAINER FINISH INSPECTION

(75) Inventors: John W. Juvinall, Ottawa Lake, MI (US); James A. Ringlien, Maumee, OH (US); Timothy J. Nicks, Maumee, OH (US); William H. Anderson, Sylvania, OH (US); Brian A. Langenderfer, Sylvania, OH (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 559 days.

(21) Appl. No.: 10/638,782

(22) Filed: Aug. 11, 2003

(51) Int. Cl.
*G01D 21/00* (2006.01)
(52) U.S. Cl. ........................................... 73/865.8
(58) Field of Classification Search ................ 73/865.8, 73/49.2, 49.3; 33/522, 534, 556, 568, 573; 209/530–532
See application file for complete search history.

(56) References Cited

U.S. PATENT DOCUMENTS

| | | | |
|---|---|---|---|
| 2,395,588 A | | 2/1946 | Shoner |
| 2,508,251 A | * | 5/1950 | Ingle ............................ 33/522 |
| 2,542,090 A | | 2/1951 | Lorenz |
| 2,687,575 A | | 8/1954 | Acton et al. |
| 3,073,034 A | | 1/1963 | Antoszewski |
| 3,106,780 A | * | 10/1963 | Uhlig ............................ 33/522 |
| 3,196,550 A | | 7/1965 | McMeekin |
| 3,206,026 A | | 9/1965 | Fouse et al. |
| 3,249,223 A | | 5/1966 | Johnson et al. |
| 3,273,710 A | | 9/1966 | Early et al. |
| 3,313,409 A | | 4/1967 | Johnson |
| 3,371,419 A | | 3/1968 | Banks et al. |
| 3,371,421 A | | 3/1968 | Fink et al. |
| 3,420,369 A | | 1/1969 | Sorbie |

(Continued)

FOREIGN PATENT DOCUMENTS

EP 0319180 7/1989

OTHER PUBLICATIONS

Photo Nos. 1 and 2 of prior art hand-held warp gauge.

(Continued)

*Primary Examiner*—Robert Raevis
(74) *Attorney, Agent, or Firm*—Reising, Ethington, Barnes, Kisselle, P.C.

(57) ABSTRACT

A container inspection apparatus and method measures both warp and off-level of an annular sealing surface of a container. The apparatus preferably has a warp gauge device and an off-level gauge device suspended over a container support and base by at least one column for the warp gauge device and a pillar for the off-level gauge device. When measuring for warp, the off-level gauge device is constructed and arranged to pivot clear of the warp gauge device, and vice-versa when measuring for off-level. The container preferably is held laterally or radially in place by two V-bracket assemblies, and vertically in place by a container support. The V-bracket assemblies are adjustable vertically to accommodate containers of differing diameters and heights. A spring loaded roller assembly supported by the pillar biases the sidewall of the container against the V-bracket assemblies assuring multiple points of contact properly to orient the container for distortion measurements by both the warp and off-level gauge devices. The V-bracket assemblies preferably are associated with a scale for orienting the containers of differing diameter along a common centerline utilized by both the warp and off-level gauge devices.

22 Claims, 6 Drawing Sheets

U.S. PATENT DOCUMENTS

| | | | |
|---|---|---|---|
| 3,422,542 A | | 1/1969 | Spurr |
| 3,464,547 A | * | 9/1969 | Becker .................. 209/532 |
| 3,618,762 A | | 11/1971 | Sklar |
| 3,722,663 A | * | 3/1973 | Nalbach ................ 198/699.1 |
| 3,819,047 A | | 6/1974 | Sorbie |
| 3,879,993 A | * | 4/1975 | Sorbie ..................... 73/104 |
| 4,135,306 A | | 1/1979 | Hannon |
| 4,174,633 A | * | 11/1979 | Hoyt et al. ............... 73/865.9 |
| 4,278,173 A | * | 7/1981 | Pemberton et al. ......... 209/522 |
| 4,433,785 A | | 2/1984 | Riggs et al. |
| 4,453,314 A | | 6/1984 | Avey |
| 4,936,018 A | | 6/1990 | Robinson et al. |
| 4,955,227 A | | 9/1990 | Fujita et al. |
| 5,231,767 A | | 8/1993 | Brinley |
| 5,351,410 A | | 10/1994 | Hainneville |
| 5,388,707 A | | 2/1995 | Stivison et al. |
| 5,414,939 A | * | 5/1995 | Waugaman ................ 33/522 |
| 5,473,161 A | * | 12/1995 | Nix et al. .................. 250/343 |
| 5,870,833 A | | 2/1999 | Van Bebber et al. |
| 5,880,359 A | * | 3/1999 | Kono et al. ................ 73/49.3 |
| 6,397,486 B1 | | 6/2002 | Keys et al. |
| 6,408,532 B1 | | 6/2002 | Keys et al. |

OTHER PUBLICATIONS

Photo Nos. 3 and 4 of prior art off-level gauge.
Schematic drawings (3 pages) of prior art warp and off-level gauge on a common base.

* cited by examiner

CONTAINER FINISH INSPECTION

The present invention is directed to inspection of containers, and more particularly to an apparatus and method for measuring distortions at the sealing surface of a container finish.

BACKGROUND OF THE INVENTION

In the manufacture of containers, such as glass or plastic bottles and jars, the container typically is formed with a finish having an axis and one or more external threads or beads for securing a closure to the finish. The finish has an open mouth surrounded by an axially facing sealing surface for sealing engagement with a closure applied to the container. Manufacturing anomalies can occur at the container sealing surface, such as a warp or an off-level condition, also known as a cocked sealing surface. A "warp" at the sealing surface generally refers to departure of the sealing surface from a planar configuration. "Off-level" refers to a tilt of the average plane of the sealing surface from an orientation perpendicular to the container axis. Warp and off-level anomalies at the sealing surface can occur in combinations, and can affect the ability of an automatic capping machine to apply a closure to the finish and/or to the ability of the closure to form an effective seal against the sealing surface.

SUMMARY OF THE INVENTION

A container inspection apparatus and method measures both warp and off-level of an annular sealing surface of a container. Preferably, the apparatus has a warp gauge device and an off-level gauge device suspended over a container support and base, preferably by means of two parallel columns for the warp gauge device and a pillar for the off-level gauge device. When measuring for warp, the off-level gauge device is constructed and arranged to pivot clear of the warp gauge device, and vice-versa when measuring for off-level.

The container is held laterally or radially in place preferable by two vertically spaced V-bracket assemblies, and is held vertically in place by a container support. Each V-bracket assembly is supported by, and adjusts vertically along the pair of, columns to accommodate containers of varying heights. A spring loaded roller assembly supported by the pillar biases the sidewall of the container against the V-bracket assemblies assuring multiple points of contact against the container sidewalls properly to orient the container for warp and off-level distortion measurements by both the warp and off-level gauge devices.

Each bracket assembly has a V-block that adjusts generally horizontally to accommodate containers of varying diameters. A pair of guide rods preferably project rearward from the V-block and through a bridging member that slides directly along the columns. Similarly, the V-bracket assembly has a scaled bar with indicia, which projects rearward from the V-block and through the bridging member. The indicia correspond to varying diameters of container sidewalls permitting pre-alignment of the V-bracket assemblies to containers having known diameters at two contact levels. Once aligned, the container is properly positioned for both warp and off-level measurements simplifying the inspection process and providing accuracy in establishing the degree of distortion in one robust and relatively compact apparatus.

BRIEF DESCRIPTION OF THE DRAWINGS

The preferred embodiment of the present invention is disclosed in the following description and in the accompanied drawings, wherein.

DETAILED DESCRIPTION OF THE PREFERRED EMBODIMENTS

Figure 1:
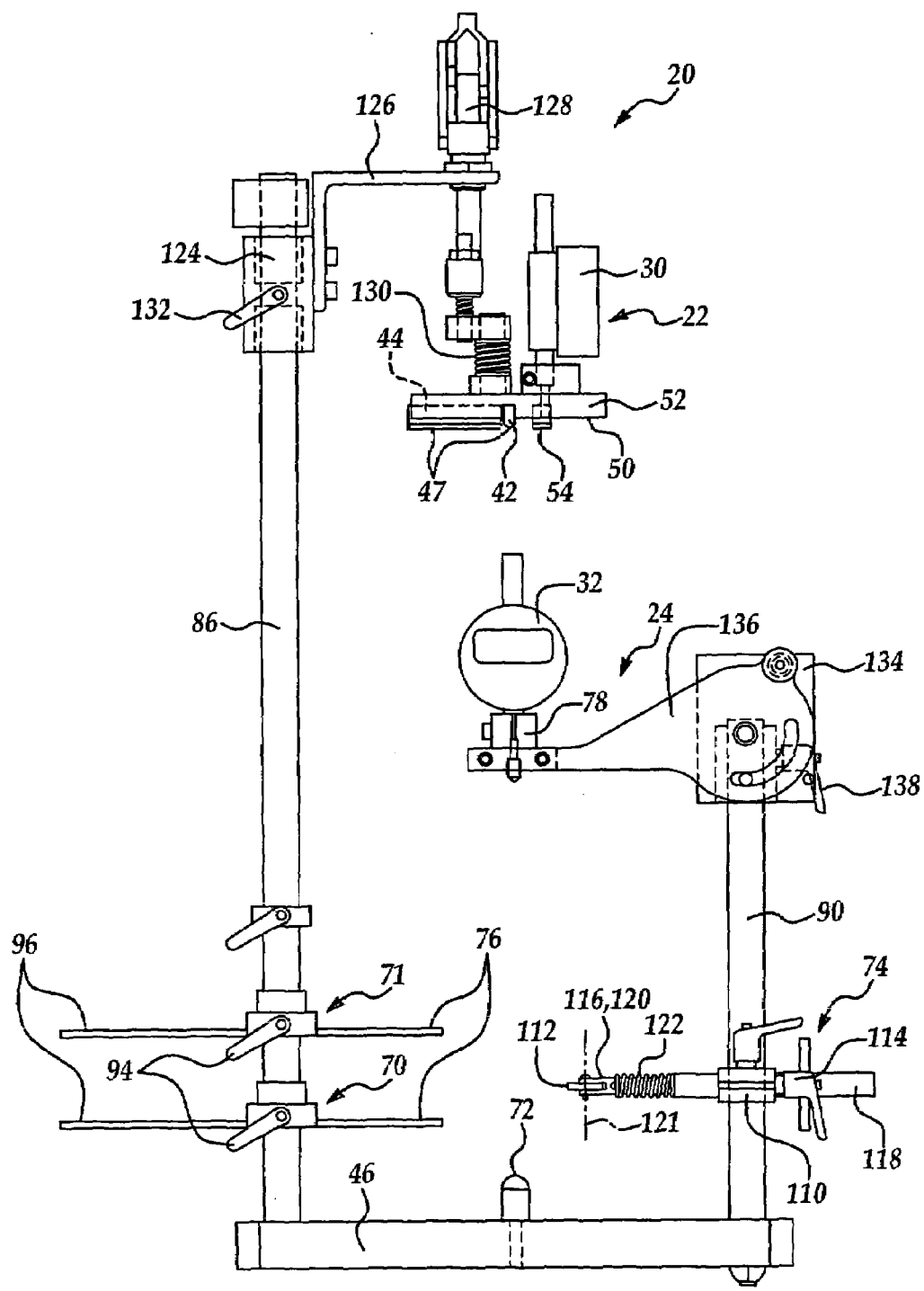
FIG. 1 is a side view of a container sealing surface inspection apparatus of the present invention.
Figure 2:
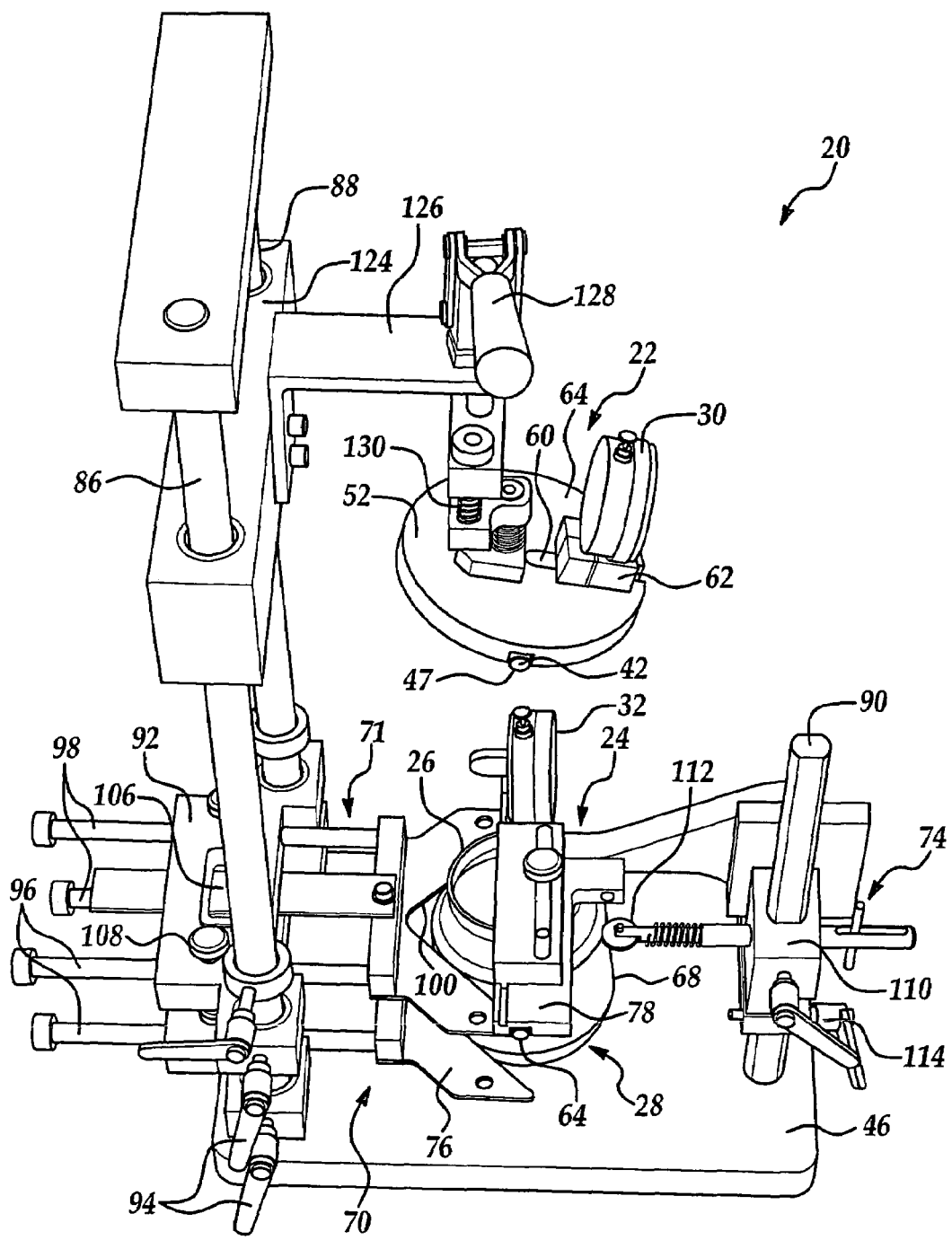
FIG. 2 is a perspective view of the container sealing surface inspection apparatus illustrating engagement of an off-level gauge device to a container.
Figure 3:
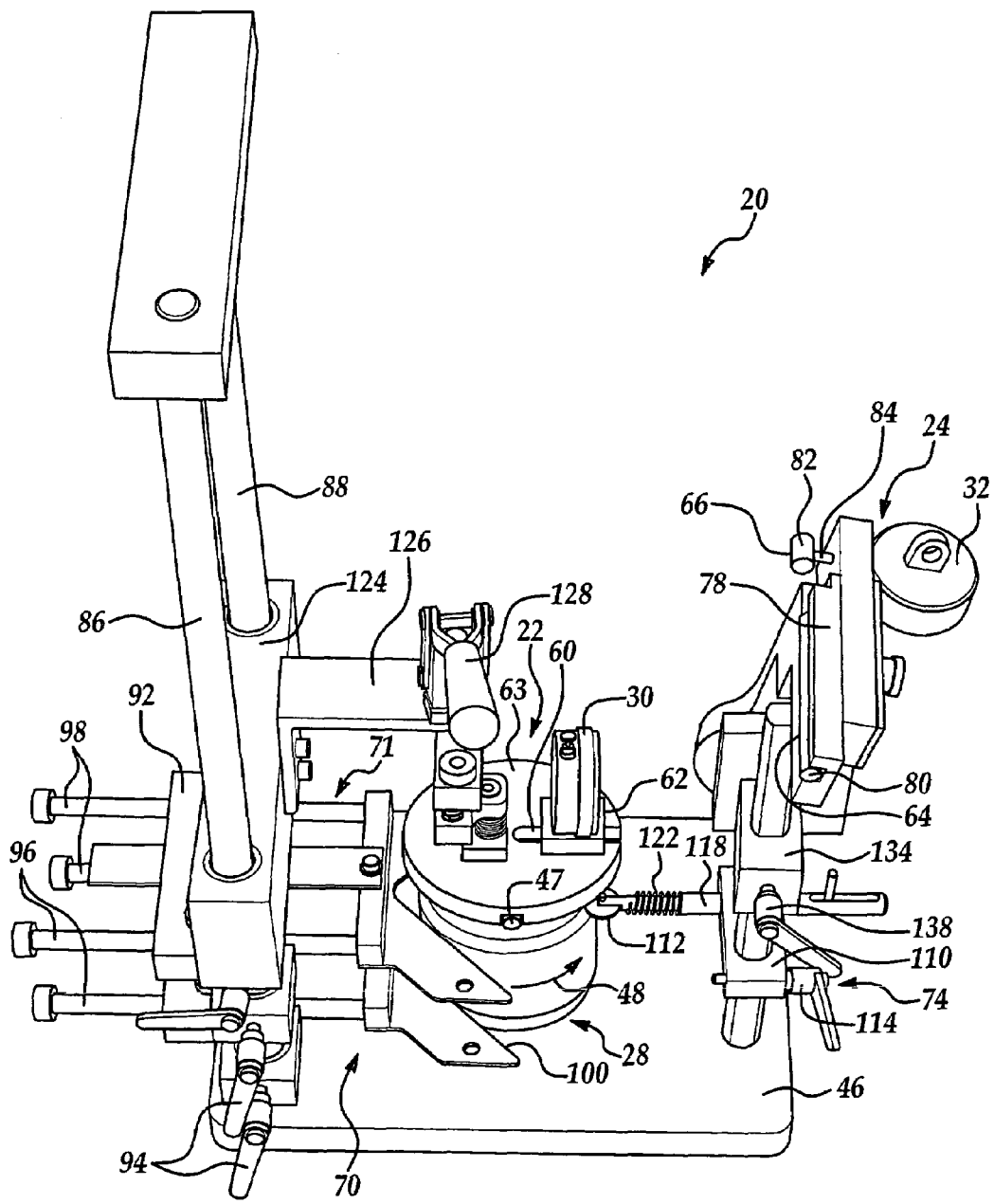
FIG. 3 is a perspective view of the container sealing surface inspection apparatus illustrating engagement of a warp gauge device.
Figure 6:
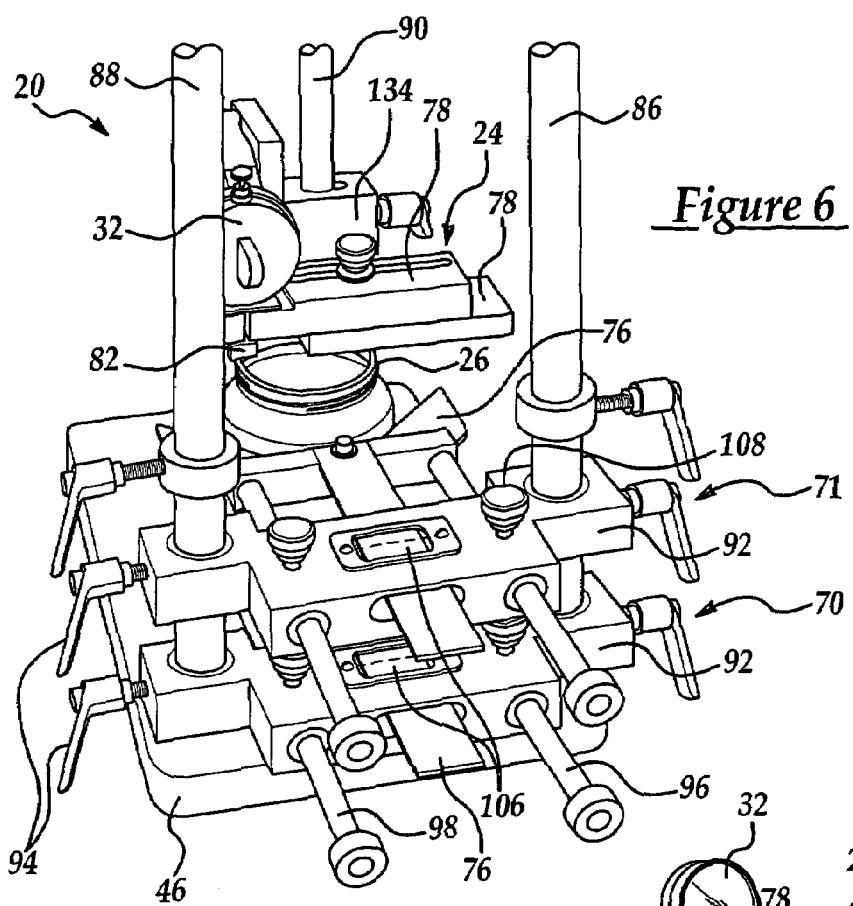
FIG. 6 is a partial perspective view of the container sealing surface inspection apparatus illustrating a V-block scale of the bracket assembly.

A container sealing surface inspection apparatus 20 of the present invention, through a warp gauge device 22 and an off-level gauge device 24, measures distortion of a substantially annular sealing surface 26 (FIGS. 2 and 6) of a glass container 28. As illustrated in FIG. 1, the devices 22, 24 are manual devices in which dial indicators or read-out gauges 30, 32 are brought into engagement with the container sealing surface 26 and the indicators are observed while the container 28 is rotated by hand.

Figure 5:
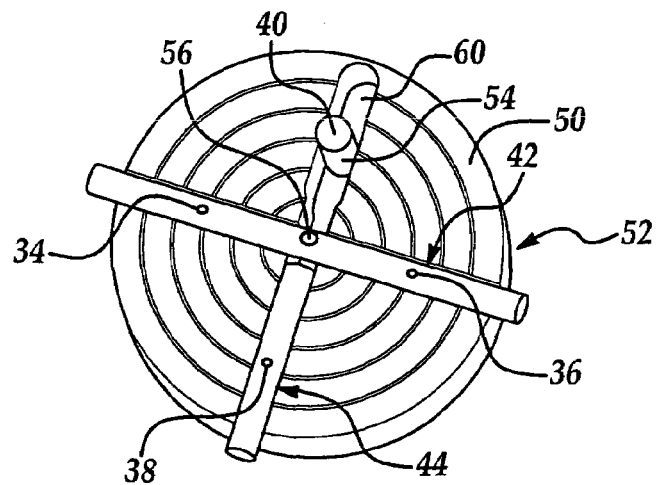
FIG. 5 is a perspective bottom view of a support plate of the warp gage device.

Referring to FIG. 5, a warp is a distortion or departure of the sealing surface 26 from being at a planar configuration. For instance, a saddle warp will have two lows and two highs corresponding to two cycles in the finish. During warp measurement, a plane generally will be defined by three orthogonally spaced points, a first point 34 at zero degrees around the sealing surface, a second point 36 at one-hundred eighty degrees, and a third point 38 at ninety degrees. The measurement will then be the deviation from this plane of the fourth point 40 at two-hundred seventy degrees.

This four-point system removes other factors such as off-level and container movement from the result, which will be discussed later in further detail. The manual measurement gauge for warp uses two solid rods or pins 42, 44 which form an elongated crest or inverted rib 47 for contacting the three circumferentially fixed points 34, 36, 38. The warp gauge device 24 measures the deviation in the fourth point 40 as illustrated in FIGS. 1 and 3-5. The device can be calibrated to zero by placing a calibration plane against the three reference points and the measurement point, and setting dial indicator 30 to zero. The deviation of the plane for a finish with a warp would then be the maximum positive (or negative) deviation from zero. An alternate method eliminates the need for this calibration. The warp measurement would be equal to one-half of the sum of the maximum and minimum readings. The container only needs to be rotated a minimum of 180° for warp (or dip) measurement. A maximum and minimum will be found in any 180°. This simplifies the hand measurement. Rotation at 360° is still required for the off-level measurement. This device will also measure the deviation from a plane for a finish with a dip. A dip is similar to warp but confined to a limited angular area of the sealing surface. The warp gauge device 22 is integrated into a support base 46, also utilized by the off-level gauge device.

The first and second pins 42, 44 of the warp gauge device 22 are mounted on, or seated into, a bottom side 50 of a support plate or disc 52 for engaging the container sealing surface 26 at the three orthogonally spaced points 34, 36, 38. The dial indicator 30 of the warp gauge device 22 mounts on the support plate 52 so that an indicator stem 54 of dial indicator 30 extends axially through the disc 52 to engage the container sealing surface 26 located below at the fourth point 40. As illustrated in FIG. 5, the first pin 42 is generally twice as long as the second pin 44 and extends through a center point 56 of the disc 52 which co-aligns to a center axis 58 of the container 28. Thus, the first two points 34, 36 located on the first pin 42 are diametrically opposed to one another. The third point 38 is located along the second pin 44 which extends generally radially outward from the center point 56 so that the third position 38 is spaced approximately ninety degrees from the first and second points 34, 36. Generally diametrically opposed to the second pin 44 is a slot 60 carried by the disc 52 which communicates axially through the disc 52 and extends radially outward from the center point 56.

The indicator stem 54 of the dial indicator 30 projects downward through the slot 60 to engage the sealing surface 26 of the container 28 at the fourth point 40. In order to adapt to container sealing surfaces 26 having varying diameters, the indicator stem 54 and dial indicator 30 are moveable along the slot 60, thus capable of adjusting radially with respect to the container 28. A rod parallel to slot 60 attached perpendicular to indicator stem 54 could eliminate or reduce the adjustment of indicator stem 54 and dial indicator 30 along slot 60.

Once the dial indicator 30 of the warp gauge device 22 is adjusted radially within the slot 60 with respect to the container 28, a block 62 that supports the dial indicator 30 and slides along a top side 63 of the disk 52 is secured rigidly to the disc 52 by at least one fastener or screw (not shown) which rides within its own slot carried by the block 62. With the container 28 held in position, the container is rotated and the indicator stem 54 along with the remaining three orthogonally spaced points 34, 36, 38 realign with respect to the sealing surface 26 thus measuring the amount of warp of the sealing surface 26 along the entire three-hundred sixty degrees.

Referring to FIGS. 1-3 and 6-8, the off-level gauge device 24 measures for an off-level condition which refers to a tilt of the average plane of the sealing surface 26 from an orientation generally perpendicular to the container axis 58. The measurement of this plane tilt or off-level is the deviation between a reference point 64 and a probe point 66 that are spaced one-hundred eighty degrees apart around the sealing surface 26. True warps at the sealing surface 26 typically are not detected during the off-level measurement because the high and the lows of a saddle warp are generally the same but one-hundred eighty degrees apart. An off-level condition of the sealing surface 26 can be measured with respect to a container sidewall 68 or a container bottom depending upon the set-up of the container sealing surface inspection apparatus 20.

Figure 7:
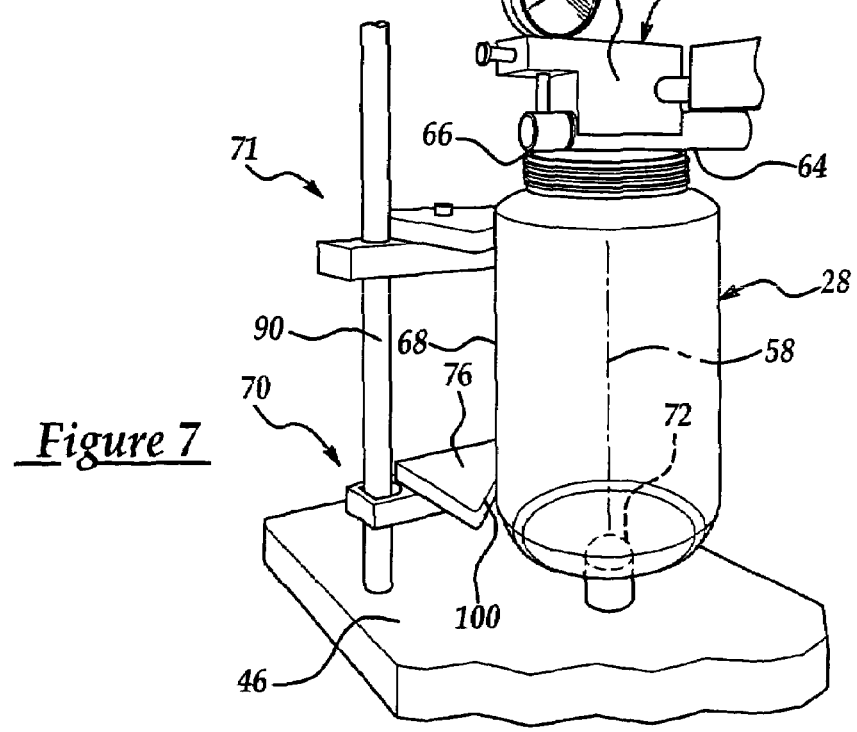
FIG. 7 is a partial perspective view of the container sealing surface inspection apparatus illustrating a container support.

For off-level measurements with respect to the container sidewall 68, the off-level gauge device 24 has two bracket assemblies 70, 71 which engage the sidewall 68 at two vertically spaced positions. As best illustrated in FIG. 7, the container 28 is held vertically by a point contact or domed apex 72 at the bottom of the container 28 substantially near the center axis 58. A spring loaded roller assembly 74 is diametrically opposed to and centered substantially axially between the two bracket assemblies 70, 71 for holding the container 28 against a pre-aligned V-block 76 of each bracket assembly 70, 71. Because the container 28 is supported by the domed apex 72, it is not restricted from tilting due to the bias of the spring loaded roller assembly 74, which creates a four point contact of the sidewall 68 against the two V-blocks 76.

The dial indicator 32 of the off-level gauge device 24 mounts on a support head 78 that carries a first rod 80 similar to the warp gauge device 22 for providing the reference contact point 64 at the sealing surface 26. A second rod or cylindrical shaped member 82 is concentric to the first rod 80, which generally intersects the center axis 58 of the container 28. The second rod 82 is attached to the distal end of a downwardly projecting indicator stem 84 of the indicator, thus providing the probe contact 66 at the sealing surface. The second rod 82 is positioned such that its curved surface easily slides along the sealing surface 26 of the container 28 reducing possible snagging during manual rotation of the container 28. As the container 28 rotates three-hundred sixty degrees, during which the four contacts at the V-blocks are continuously maintained, the off-level measurement is read by observing the dial indicator 32. The continuously maintained contacts of the four points is what provides the side reference.

Figure 4:
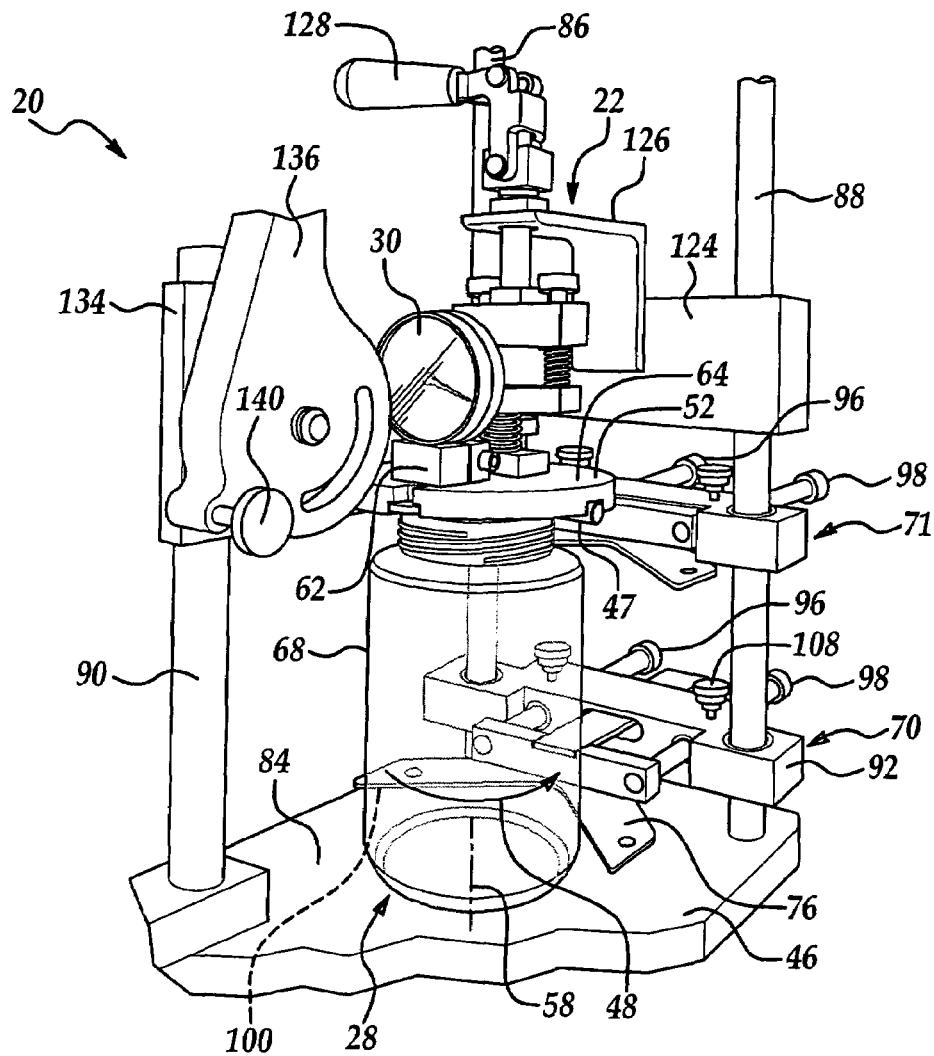
FIG. 4 is a partial perspective view of the container sealing surface inspection apparatus illustrating engagement of a bracket assembly engaged to a side wall of the container.
Figure 8:
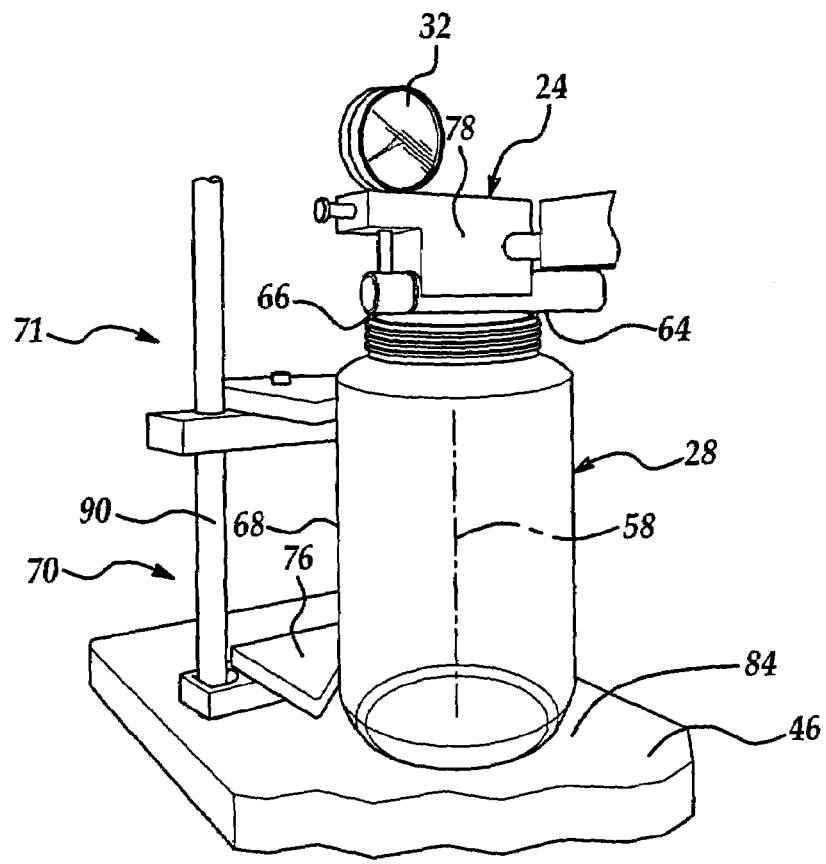
FIG. 8 is a partial perspective view of the container sealing surface inspection apparatus illustrating a second embodiment of a container support.

Referring to FIGS. 4 and 8, for off-level measurement with respect to the container bottom of the container 28, the domed apex 72 and the roller assembly 74 are removed so that the container bottom surface rests squarely upon a planar container support 84 and the sidewall 68 of the container 28 is in contact with one V-block 76 at two contacts, instead of two V-blocks 76 amounting to four contacts.

More specific to the present invention, the warp and off-level gauge devices 22, 24 are supported by the common support base 46 which carries the container support and/or domed apex 72, 84. A pair of parallel columns 86, 88 projecting upward from the support base 46 adjustably support the warp gauge device 22 and the pair of bracket assemblies 70, 71 oriented below the warp gauge device 22. A pillar 90 projecting upward from the support base 46 adjustably supports the off-level gauge device 24 and the roller assembly 74 oriented below the off-level gauge device 24. When measurement of warp is desired, the off-level gauge device 24 is cleared from the sealing surface 26 by being generally pivoted upward, and the warp gauge device 22 is lowered upon the sealing surface 26 along the columns 86, 88. For off-level measurements, the warp gauge device 22 is slid upward along the columns 86, 88 enabling the off-level gauge device 24 to be pivoted downward upon the sealing surface 26.

When measuring for warp and side-reference off-level, the bracket assemblies 70, 71, the domed apex 72 and the spring-loaded roller assembly 74 are utilized and must be pre-aligned with respect to container height to achieve maximum spacing between the bracket assemblies 70, 71 and vertical centering of the roller assembly 74 between the bracket assemblies 70, 71 to optimize the four point contact of the V-blocks 76. To accomplish this, each bracket assembly 70, 71 has a substantially horizontal bridging member 92 which carries vertical communicating bores which receive the respective columns 86, 88 for sliding the bracket assemblies 70, 71 vertically while eliminating any horizontal or lateral movement. When the desired vertical placement is achieved, the bracket assemblies 70, 71 are locked to the columns 86, 88 by tightening of respective locking levers 94, which are threaded to the bridging member 92 adjacent each column 86, 88.

Figure 9:
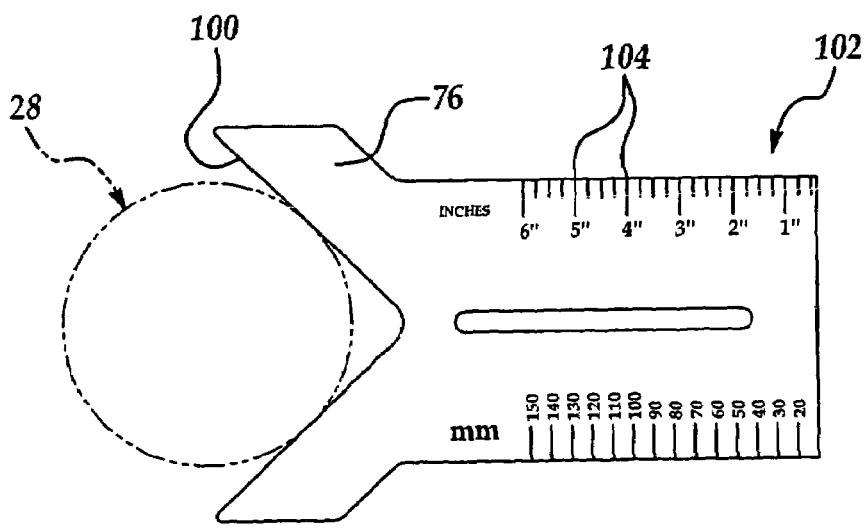
FIG. 9 is a top view of the V-block scale of the bracket assembly.

Each bridging member 92 also carries a horizontal bore at each end for slideably receiving respective parallel guide bars 96, 98 of the bracket assembly 70, 71 that project rearward from the V-block 76, and opposite angulated edges 100 of the V-block 76 which directly engage the sidewall or finish 68 of the container 28. The guide bars 96, 98 assure that the V-blocks 76 adjust along consistent parallel planes. This adjustment is measured by a V-block scale 102, as best illustrated in FIG. 9, which is a bar having indices 104 and projecting rearward from the V-block 76 and through the bridging member 92. The bridging member 92 carries a viewing window 106 having an index point or line for reading the horizontal movement of the bracket assembly 70, 71, which corresponds to the container sidewall diameter. Once the desired horizontal placement is achieved, the bridging member 92 is locked to the guide bars 96, 98 by tightening of respective locking screws 108 which are threaded to the bridging member 92 adjacent each guide bar 96, 98.

With the bracket assemblies 70, 71 adjusted to the height and diameter of the container 28, a sliding block 110 of the roller assembly 74 that receives the pillar 90 is slid vertically along the pillar 90 until a roller 112 of the assembly 74, which directly engages the sidewall 68, is oriented vertically between the two bracket assemblies 70, 71. When so oriented, a lock down lever 114 threaded to the block 110 and adjacent to the pillar 90 is tightened to lock the roller assembly 74 vertically to the pillar 90. The roller assembly 74 also includes a cantilevered structure 116 projecting horizontally from the slide block 110 within a sleeve 118 to a distal end 120, which rotationally attaches to the roller 112 having a vertical rotational axis 121 so that the container 28 is easily rotated about its center axis 58. A coiled spring 122 compresses between the distal end 120 of the cantilevered structure 116 and the sleeve 118 to comply with differing container diameters while biasing the container 28 horizontally against the V-blocks 76.

Similar to the bracket assemblies 70, 71, the warp gauge device 22 has a bridging portion 124 that receives both columns 86, 88. An arm 126 of the warp gauge device projects laterally outward from the bridging portion 124 and attaches to the disc 52 through a plunger type clamp 128 and a series of springs 130 that generally bias the disc 52 against the sealing surface 26. The springs 130 allow limited vertical movement and tilting of the disk 52 due to container warp or distortion while maintaining continuous contact between the four orthogonally spaced contact points 34, 36, 38, 40 and the sealing surface 26 while the container 28 is manually rotated at least 180°. The attachment to the disk 52 through the springs is made at a point that is offset from the center of the disk to ensure the head stays in contact with the sealing surface. This attachment point preferably is within a triangle formed by where the three fixed points contact the sealing surface of the container. Lockdown levers 132 (as illustrated in FIG. 1) are threaded to the bridging portion 124 adjacent each column 86, 88 vertically to secure the warp gauge device 22 either against the sealing surface 26 of a test container or well above the container 28 and out of the way of the off-level gauge device 24.

The off-level gauge device 24 is coupled to the pillar 90 by a support block 134, which carries a vertically extending bore having a non-cylindrical profile that substantially corresponds to the cross-sectional profile of the flat sided pillar 90. This non-cylindrical relationship prevents the off-level gauge device 24 from rotating around the pillar 90 and permits only a vertical adjustment of the device 24 to correspond with differing container heights. A leg 136 of the off-level gauge device 24 engages rotatably to the support block 134 at one end and supports the head 78 at a distal end above the container 28 during off-level measurements. As the leg 136 rotates with respect to the support block 134, the head 78 pivots with the dial indicator 32 toward or away from the container 28. A lockdown lever 138 is threaded to the support block 134 adjacent the pillar 90 vertically to secure the off-level gauge device 24 to the pillar 90. A spring loaded plunger 140 is attached to the leg 136 to prevent further pivoting action.

While the forms of the invention herein disclosed constitute presently preferred embodiments, many others are possible. It is not limited herein to mention all the possible equivalent forms or ramifications of the invention. It is understood that the terms used herein are merely descriptive rather than limiting and that various changes may be made without departing from the spirit or scope of the invention.

The invention claimed is:

1. Apparatus for inspecting a container sealing surface, which includes:
   a support base,
   a container support on said base for engaging and supporting the bottom of a container such that the container is in vertical orientation over said support base,
   at least one bracket having angulated edges for engaging and locating the sidewall of a container on said container support,
   a roller for resiliently engaging the container sidewall opposite said at least one bracket to hold the container sidewall against said edges,
   at least one slide mounting said bracket to said support base for adjustment with respect to said container support to accommodate containers of different sizes, and
   a measurement head over said support base for engaging the sealing surface of a container on said container support and held by said roller against said bracket.

2. The apparatus set forth in claim 1 further including a scale on said at least one bracket and coupled to said support base, said scale bearing indicia in units of container size to facilitate adjustment of said bracket on said support base.

3. The apparatus set forth in claim 2 comprising at least two of said brackets for engaging the container sidewall at vertically spaced positions, each of said brackets having an associated scale.

4. A container inspection apparatus for inspecting a container sealing surface, which includes:
   a support base,
   a container support on the support base for engaging and supporting a bottom surface of the container such that the container is vertically orientated over the support base,
   at least one bracket assembly having angulated edges for engaging and locating a sidewall of the container on the container support, said at least one bracket assembly having a sliding member mounting the bracket assembly to the support base for vertical adjustment to accommodate containers of different sizes,
   a measurement device oriented over the support base for engaging the sealing surface of the container on the container support, and
   a scale on the at least one bracket assembly carried by the sliding member;
   a V-block of the at least one bracket assembly coupled slidably to the sliding member and attached to the scale, wherein the angulated edges are carried by the V-block.

5. The container inspection apparatus set forth in claim 4 wherein the scale bears indicia in units of container size to facilitate adjustment of the V-block on the sliding member.

6. The container inspection apparatus set forth in claim 5 wherein said at least one bracket assembly includes at least two bracket assemblies for engaging the container sidewall at vertically spaced positions.

7. The container inspection apparatus set forth in claim 6 wherein, in each of said bracket assemblies, the V-block slides horizontally with respect to the sliding member.

8. The container inspection apparatus set forth in claim 7 comprising at least one column projecting upward from the support base, wherein the sliding member is vertically oriented adjustably upon the at least one column.

9. The container inspection apparatus set forth in claim 8 wherein each one of the at least two bracket assemblies sliding vertically independently from an adjacent one of the at least two bracket assemblies.

10. The container inspection apparatus set forth in claim 7 comprising:
a first column projecting upward from the support base and through a first bore of the sliding member;
a second column disposed parallel to the first column and projecting upward from the support base and through a second bore of the slide member; and
wherein the sliding member is vertically oriented adjustably upon and bridges the first and second columns.

11. The container inspection apparatus set forth in claim 10 comprising a first lock-down lever engaged threadably to the sliding member for lateral contact against the first column within the first bore.

12. The container inspection apparatus set forth in claim 11 comprising a second lock-down lever engaged threadably to the sliding member for lateral contact against the second column within the second bore.

13. The container inspection apparatus set forth in claim 12 comprising a warp gauge device supported by the support base and suspended adjustably above the container.

14. The container inspection apparatus set forth in claim 12 comprising an off-level gauge device supported by the support base and suspended adjustably above the container.

15. The container inspection apparatus set forth in claim 13 wherein the warp gauge device is supported by and slides vertically with respect to the at least one column above the at least two bracket assemblies.

16. The container inspection apparatus set forth in claim 15 comprising:
a pillar projecting upward from the support base;
a spring loaded roller assembly supported by the pillar and opposed diametrically and disposed vertically between the at least two bracket assemblies.

17. The container inspection apparatus set forth in claim 16 wherein the container is supported vertically by and positioned concentrically to the container support and supported laterally between the at least two bracket assemblies and the spring loaded roller assembly.

18. The container inspection apparatus set forth in claim 17 wherein the container support is a domed apex for producing a point contact with a bottom finish surface of the container.

19. A container inspection apparatus for inspecting a container sealing surface, which includes:
a support base;
a container support on the support base for engaging and supporting the bottom of a container such that the container is in vertical orientation over the support base;
at least one bracket assembly having angulated edges for engaging and locating the sidewall of the container on the container support;
a roller for resiliently engaging the container sidewall diametrically opposite the angulated edges to hold the container sidewall against the edges;
at least one measurement device oriented over the support base for engaging the sealing surface of the container at least one contact point and a probe contact point;
at least one column projecting upward from the support base;
the at least one bracket assembly being an upper and a lower bracket assembly both supported by the at least one column, and wherein each angulated edge of each bracket assembly directly contacts a sidewall of the container at two contact points;
a warp gauge device of the at least one measurement device supported by the column above the upper and lower bracket assemblies;
a pillar projecting upward from the support base;
a spring loaded roller assembly having the roller and being supported vertically adjustably by the pillar to align the roller vertically between the upper and lower bracket assemblies; and
an off-level gauge device of the at least one measurement device support by the pillar above the roller assembly.

20. A method of inspecting a sealing surface of a container comprising the steps of:
adjusting a bracket assembly horizontally by utilizing an indexed scale of the bracket assembly which corresponds with a known diameter of the container;
placing a bottom finish surface of the container upon a container support carried by a support base so that the container is in an upright position;
moving the container laterally against a V-block of the bracket assembly to center the container upon the container support;
engaging a spring biased roller assembly opposed diametrically to the V-block against the container;
sliding a warp gauge device engaged slidably upon a column projecting upward from the support base downward toward the sealing surface of the container;
contacting the warp gauge device upon the sealing surface at least four circumferentially spaced points wherein one point of the at least four points is a probe contact with an indicator stem of a gauge read-out of the warp gauge device;
rotating the container upon the container support; and
recording the readings from the warp gauge device.

21. The method of inspecting set forth in claim 20 comprising the additional steps of:
raising the warp gauge device along the column;
pivoting an off-level gauge device with respect to a pillar, projecting upward from the support base, downward upon the sealing surface and beneath the warp gauge device;
rotating the container upon the container support; and
recording the readings from the off-level gauge device.

22. A container inspection apparatus for inspecting a container sealing surface, which includes:
a support base,
a container support on the support base for engaging and supporting a bottom surface of the container such that the container is vertically orientated over the support base,
at least one bracket assembly having angulated edges for engaging and locating a sidewall of the container on the container support, said at least one bracket assembly having a sliding member mounting the bracket assembly to the support base for vertical adjustment to accommodate containers of different sizes, a measurement device oriented over the support base for engaging the sealing surface of the container on the container support, a roller assembly opposed diametrically to the at least one bracket assembly and supported by the support base, the container being supported vertically by and positioned concentrically to the container support and supported laterally between the at least one bracket assemblies and the roller assembly, a pillar projecting upward from the support base, a cantilevered structure of the roller assembly projecting laterally from the pillar, and constructed and arranged to slide adjustably vertically with respect to the pillar to accommodate containers of different longitudinal sizes, a roller of the roller assembly engaged operatively to the cantilevered structure, wherein the roller has a rotational axis disposed vertically, and a spring of the roller assembly constructed and arranged to bias the roller against the sidewall of the container.

* * * * *